US012562811B2

(12) United States Patent
Madala et al.

(10) Patent No.: US 12,562,811 B2
(45) Date of Patent: Feb. 24, 2026

(54) EQUALIZATION SETTING VALUE DETERMINATIONS FOR ELECTRICAL SIGNALS TRANSMITTED TO AND/OR RECEIVED FROM OPTICAL MODULES

(71) Applicant: VIAVI SOLUTIONS INC., Chandler, AZ (US)

(72) Inventors: Sunitha VeerendraKumar Madala, Germantown, MD (US); Michael Scott Koller, Gaithersburg, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 404 days.

(21) Appl. No.: 18/352,773

(22) Filed: Jul. 14, 2023

(65) Prior Publication Data

US 2025/0023636 A1     Jan. 16, 2025

(51) Int. Cl.
*H04B 10/073*          (2013.01)

(52) U.S. Cl.
CPC ....... *H04B 10/073* (2013.01); *H04B 10/0731* (2013.01)

(58) Field of Classification Search
None
See application file for complete search history.

(56) References Cited

U.S. PATENT DOCUMENTS

| | | | | | |
|---|---|---|---|---|---|
| 8,254,781 | B2 * | 8/2012 | Lindsay | ............... | H04B 17/345 |
| | | | | | 398/16 |
| 8,811,815 | B2 * | 8/2014 | Xia | .................... | H04B 10/0773 |
| | | | | | 398/31 |
| 9,467,758 | B2 * | 10/2016 | Chiu | .................. | H04Q 11/0067 |
| 11,502,750 | B2 * | 11/2022 | Murphy | ............. | H04B 10/0795 |
| 11,695,475 | B2 * | 7/2023 | Madala | ............ | H04B 10/07955 |
| | | | | | 398/16 |
| 2008/0101794 | A9 * | 5/2008 | Swenson | ............ | H04B 10/0731 |
| | | | | | 398/23 |

* cited by examiner

Primary Examiner — Jai M Lee
(74) *Attorney, Agent, or Firm* — Mannava & Kang, P.C.

(57) ABSTRACT

According to examples, a test instrument may determine equalization setting values for electrical signals communicated with optical modules. Particularly, the test instrument may automatically determine the equalization setting values that may result in an optimal signal quality metric of electrical signals communicated with an optical module. The test instrument may generate test signals having a plurality of equalization setting value permutations applied to the test signals and may determine respective signal quality metrics of the test signals returned from the optical module. In other examples, the optical module may generate the test signals and the optical module or the test instrument may determine the respective signal quality metrics of the test signals. In either of these examples, the values of the equalization settings may be set to be applied on electrical signals communicated with the optical module to improve a quality of the electrical signal communications with the optical module.

20 Claims, 7 Drawing Sheets

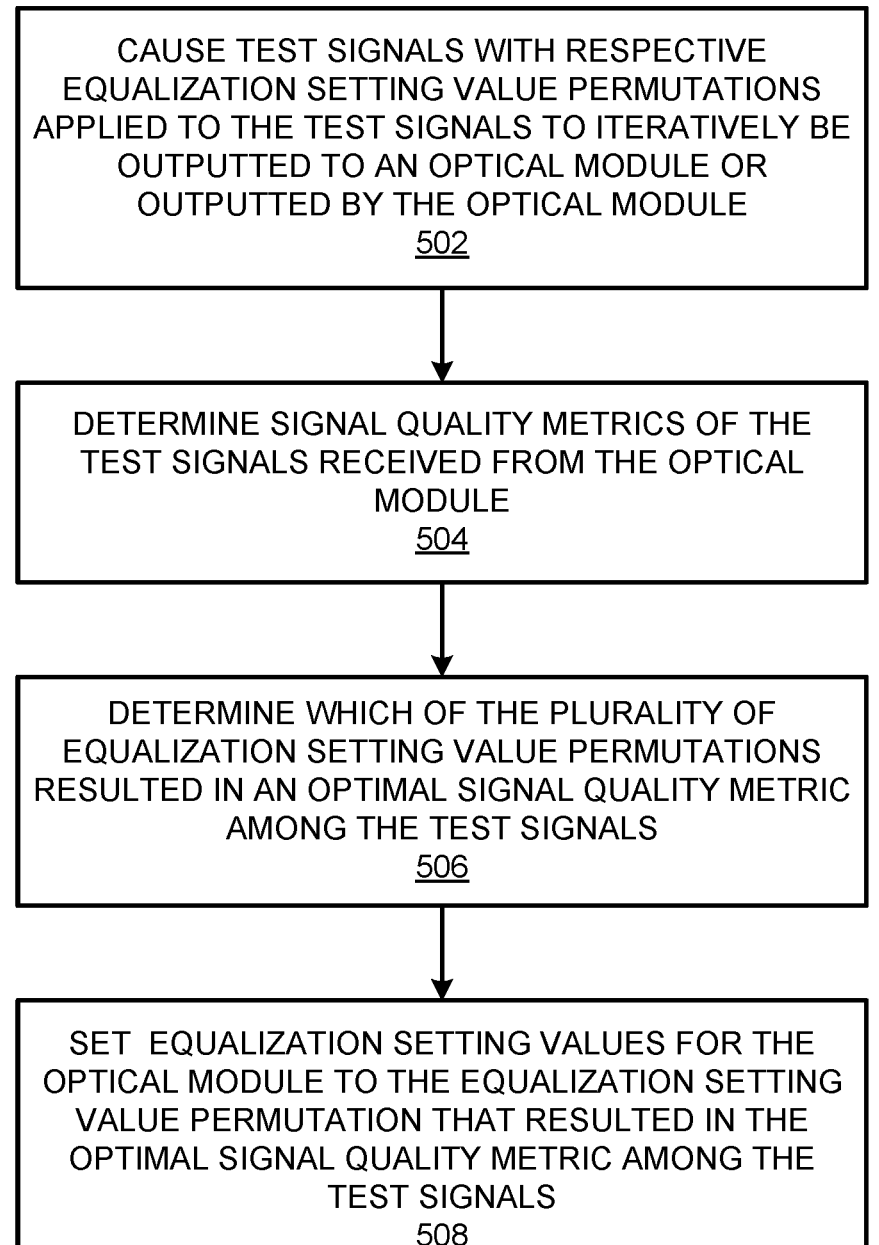

500

CAUSE TEST SIGNALS WITH RESPECTIVE
EQUALIZATION SETTING VALUE PERMUTATIONS
APPLIED TO THE TEST SIGNALS TO ITERATIVELY BE
OUTPUTTED TO AN OPTICAL MODULE OR
OUTPUTTED BY THE OPTICAL MODULE
502

DETERMINE SIGNAL QUALITY METRICS OF THE
TEST SIGNALS RECEIVED FROM THE OPTICAL
MODULE
504

DETERMINE WHICH OF THE PLURALITY OF
EQUALIZATION SETTING VALUE PERMUTATIONS
RESULTED IN AN OPTIMAL SIGNAL QUALITY METRIC
AMONG THE TEST SIGNALS
506

SET EQUALIZATION SETTING VALUES FOR THE
OPTICAL MODULE TO THE EQUALIZATION SETTING
VALUE PERMUTATION THAT RESULTED IN THE
OPTIMAL SIGNAL QUALITY METRIC AMONG THE
TEST SIGNALS
508

*FIG. 5*

EQUALIZATION SETTING VALUE DETERMINATIONS FOR ELECTRICAL SIGNALS TRANSMITTED TO AND/OR RECEIVED FROM OPTICAL MODULES

TECHNICAL FIELD

The disclosure relates generally to test instruments for optical modules, and more specifically, to test instruments that may determine equalization setting values to be applied to electrical signals transmitted to and/or received from optical modules, in which application of the equalization setting values may improve a quality of the electrical signals transmitted to and/or received from the optical modules.

BACKGROUND

Fiber optic technologies enable high levels of bandwidths and port densities, while having low power demands. For instance, some fiber optic products that are able to communicate data at relatively high bit rates, such as 10G, 25G, 40G, 100G, 200G, 400G, or more, may be employed in data centers and other environments to provision the high levels of bandwidths and port densities, while having the low levels of power demands.

An optical module, which may also be termed an optical transceiver, a transceiver, or the like, sends and receives optical signals to/from fiber optic lines. An optical module may be characterized by its data rate and the maximum distance the signal can travel. The optical module may be connected between an electrical telecommunication system and an optical telecommunications system, and may include a host interface connected to the electrical telecommunication system and a line interface connected to the optical telecommunications system.

BRIEF DESCRIPTION OF THE DRAWINGS

Features of the present disclosure may be illustrated by way of example and not limited in the following figure(s), in which like numerals indicate like elements, in which:

FIG. 5 depicts a flow diagram of a method for determining equalization setting values for an optical module and/or a test instrument, according to an example of the present disclosure;

DETAILED DESCRIPTION

Figure 1:
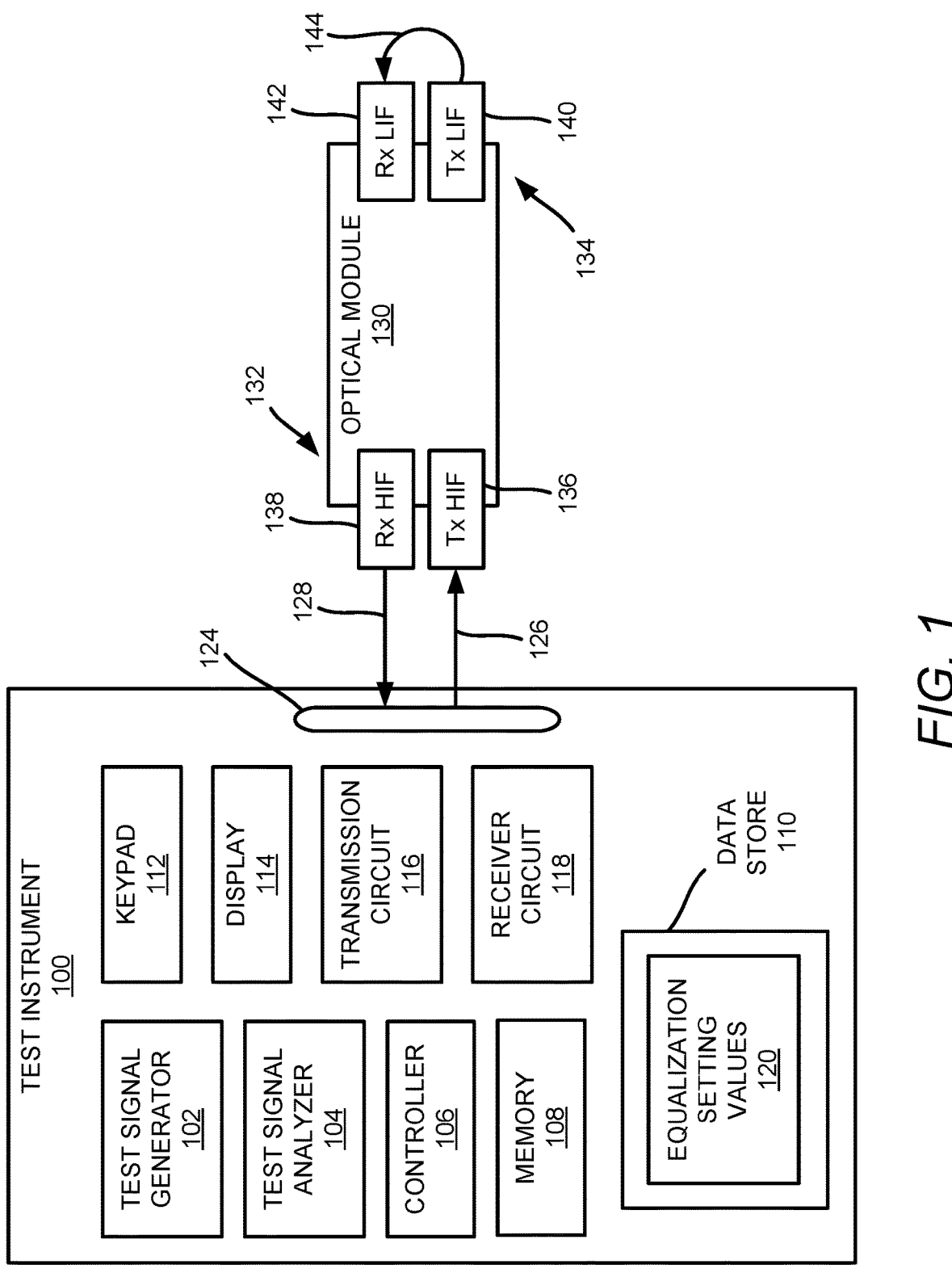
FIG. 1 shows a block diagram of a test instrument for performing tests and measurements, according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

An optical module, which may also be called a fiber optic transceiver or an optical transceiver, may be used in high-bandwidth data communications applications. Optical modules may have an electrical interface on a host side that connects to a host in a system and an optical interface on a media side that connects to a fiber optic cable. Optical modules may either plug into a front panel socket or an on-board socket, and in some instances, may be hot-swappable. In operation, optical modules are to convert electrical signals received from the host side into equivalent light signals and to convert light signals received from the media side into equivalent electrical signals.

The host may include a transmission circuit or other device for sending electrical signals into an optical module such that the optical module may convert the electrical signals into equivalent light signals. The optical module may communicate the converted light signals to a remotely located device over a network via a fiber optic cable. The optical module may also communicate electrical signals to the host, in which the electrical signals may correspond to converted light signals. In this regard, the host may also include a receiver circuit or other device for receiving electrical signals from the optical module.

In some instances, the electrical interfaces between the host and the optical module may not be optimized and the electrical signal outputted from the transmission circuit may be in a less than ideal state when the electrical signal arrives at the optical module. Similarly, the electrical signal outputted from the optical module may not be optimized and thus, the electrical signal may be in a less than ideal state when the electrical signal arrives at the host. In some instances, the quality of the electrical signal communications may be determined based on bit error rates (BERs) of the electrical signal communications. BERs may be calculated by dividing the quantity of bits received in error by the total number of bits transmitted within the same time period. Thus, a higher BER may be an indication that a larger quantity of bits were received in error and thus, the state or quality of the electrical signal communications were more degraded than electrical signal communications for which the BER was lower.

Attenuation in a channel between the host and the optical module may reduce the quality of the electrical signal communications. In some instances, equalization may be added to the channel to account for the attenuation in the channel. Some hosts include the ability to change optical module signal characterization settings, e.g., transmit equalization settings, such that those settings may be modified to achieve better or more optimal electrical signal communications with the optical module. The equalization settings may include a pre-cursor setting, a post-cursor setting, and a swing setting, among other settings, with each of the equalization settings having multiple possible settings.

Changing the equalization settings to various values may affect signal quality in different manners.

Some vendors of optical modules may define the equalization settings for their optical modules based on the vendor's testing environment. However, the vendor's testing environment may not be in-line with the signal characteristics of the host and thus, the equalization settings defined by the vendors may not be ideal for the link between the host and the optical module.

In many instances, when the quality of the electrical signal communications is relatively low, e.g., the BER is outside of operational limits, result in uncorrectable errors, and/or the like, users of the optical modules may not understand the cause of the degraded performance. Users may also be unaware as to how to modify the equalization settings such that the quality of the electrical signal communications may be improved. It may thus take the cooperation of the user with technical support to derive optical module signal characterization settings that improve the quality of the electrical signal communications. As there are a significantly large number of possible combinations of optical module signal characterization settings, manually modifying the settings to improve the quality of the electrical signal communications may not be a viable option. That is, manually identifying the settings that result in improved and/or optimized quality, e.g., minimized BER, may be labor intensive and extremely challenging even for the most technical of users. As a result, many users may forego attempting to improve the quality of the electrical signal communications between the host and the optical module.

A technical issue associated with conventional use of optical modules may thus be that the electrical signal communications may have degraded performance, which may cause lower reliability of the connection or data transfer between hosts and optical modules. Through implementation of the features of the present disclosure, the equalization setting values (e.g., optical module signal characterization setting values) that may improve and/or optimize the electrical signal communications between hosts and optical modules may be determined and the settings may be set to those values. As a result, a technical improvement afforded through implementation of the features of the present disclosure may be that an improved or optimal values for the optical module signal characterization settings may be determined and the optical module signal characterizations settings may be set to those values, which may improve reliability of the connection or data transfer between hosts and optical modules. As discussed herein, the optical module signal characterization settings may be determined for a host and/or an optical module.

Disclosed herein are test instruments and methods for automatically determining equalization setting values for the test instrument and/or an optical module, in which the determined equalization setting values may improve a quality of electrical signal communications with the optical module. Particularly, a controller of a test instrument may cause test signals to be outputted from the test instrument to the optical module, in which the test signals may be outputted with respective ones of a plurality of equalization setting value permutations applied on the test signals. The controller may determine respective signal quality metrics of the test signals received from the optical module and may determine which of the plurality of equalization setting value permutations resulted in an optimal signal quality metric among the outputted test signals. The controller may also set values for the equalization settings to be applied on electrical signals outputted to and/or received from the optical module to values corresponding to the equalization setting value permutation that resulted in the optimal signal quality metric among the outputted test signals.

In some examples, the test instrument may generate the test signals and may output the test signals to the optical module with respective ones of the equalization setting value permutations applied to the test signals. In other examples, the optical module may generate the test signals and may output the test signals with respective ones of the equalization setting value permutations applied to the test signals.

In examples in which the optical module is configured to generate the test signals, the optical module may generate the test signals with the respective ones of the plurality of equalization setting value permutations. The optical module may also output the test signals to the test instrument and may receive the test signals from the test instrument. The optical module may also determine the signal quality metrics on the test signals received back from the test instrument. In addition, the optical module may communicate the determined signal quality metrics to the test instrument, and the controller in the test instrument may set values for the equalization settings to be applied on electrical signals outputted to and/or received from the optical module to values corresponding to the equalization setting value permutation that resulted in the optimal signal quality metric among the outputted test signals.

Figure 2:
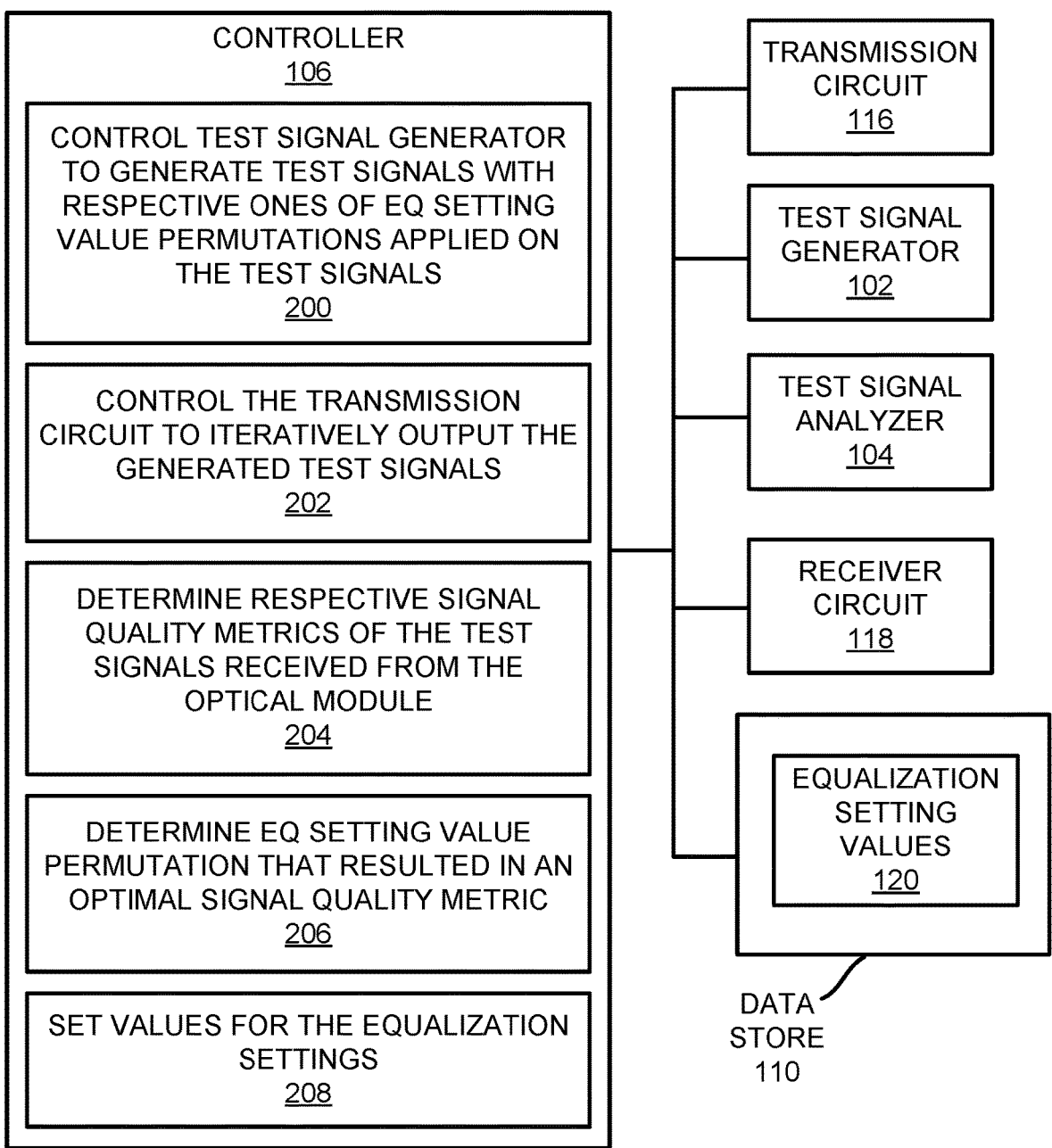
FIG. 2 depicts a block diagram of various components of the test instrument depicted in FIG. 1, according to an example of the present disclosure.

Reference is first made to FIGS. 1 and 2. FIG. 1 shows a block diagram of a test instrument 100 for performing tests and measurements, according to an example of the present disclosure. FIG. 2 depicts a block diagram of various components of the test instrument 100 depicted in FIG. 1, according to an example of the present disclosure. It should be understood that the test instrument 100 may include additional features and that some of the features described herein may be removed and/or modified without departing from the scope of the test instrument 100.

The test instrument 100 shown in FIGS. 1 and 2 may perform tests and measurements on an optical module 130. In some examples, the test instrument 100 may also perform other types of tests, such as optical fiber cable tests, network tests, tests on network devices, and/or the like. The test instrument 100 may perform the tests and measurements by generating and transmitting to and/or receiving test signals from the optical module 130. In some examples, the test instrument 100 may be a specially configured device that is designed and configured to perform the tests and measurements. An example of such a test instrument is discussed below with respect to FIGS. 6 and 7.

The test instrument 100 may include a variety of components including a test signal generator 102, a test signal analyzer 104, a controller 106, a memory 108, and a data store 110. The test signal generator 102 and the test signal analyzer 104 may include separate circuits or may be parts of the same circuit. According to examples, the controller 106 is a field programmable gate array (FPGA) or other programmable logic device. Particularly, for instance, the controller 106 may be an integrated circuit made up of a matrix of configurable logic blocks.

In addition, or in other examples, the controller 106 is a microcontroller, a digital signal controller (DSP), an application specific integrated circuit (ASIC), discrete gate or transistor logic, discrete hardware components, or any combination thereof designed to perform the functions and methods described herein. In some examples, the controller 106 may perform one or more of the functions and operations of the test instrument 100 described herein executing machine readable instructions stored in a memory 108. In some examples, the controller 106 includes a combination of a FPGA and a microcontroller, in which the FPGA may perform certain operations and the microcontroller may perform other operations discussed herein. In some examples, the controller 106 may execute the instructions stored in the memory 108 in instances in which the controller 106 includes a microcontroller. By way of particular example, the FPGA may perform various control operations and the microcontroller may perform determination and data storage operations.

The memory 108 may be a non-transitory computer readable medium, which may include RAM (random access memory), ROM (read only memory), EPROM (erasable, programmable ROM), EEPROM (electrically erasable, programmable ROM), hard drives, flash memory, or other types of storage devices, which may be volatile and/or nonvolatile. The memory 108 may be omitted from the test instrument 100 in instances in which the controller 106 is not a microprocessor.

The test signal generator 102 may generate test signals for measuring the performance, e.g., signal quality metrics, of the optical module 130, such as bit error rate, symbol error rate distribution, eye diagram analysis, optical parameters such as optical modulation amplitude (OMA), receiver sensitivity, jitter, and other measurements. In addition, the test signal analyzer 104 may measure looped back test signals to measure the performance of the optical module 130. In an example, the test signals may be pseudorandom binary sequence (PRBS) test patterns, such as PRBS13Q, PRBS31Q, etc., and the test signal analyzer 104 may receive looped-back PRBS test patterns to measure performance of the optical module 130.

The test instrument 100 may also include a user interface which may include a keypad 112 and/or a display 114. For example, the display 114 may be a liquid crystal display (LCD), a light emitting diode (LED) display, or the like, and may be a touch screen display or other type of display. In instances in which the display 114 is a touch screen display, the keypad 112 may be omitted. In some examples, a user (e.g., a technician) may interact with the test instrument 100 via the user interface (keypad 112 and/or display 114) to enter information, select operations, view measurements, examine signal profiles, communicate with other devices, etc. For instance, a user may initiate an automated equalization setting value determination operation through the user interface 112, 114.

The test instrument 100 may further include a transmission circuit 116 that may send test signals to the optical module 130. The transmission circuit 116 may include, among other things, encoders, modulators, and other components for transmitting test signals. The test instrument 100 may further include a receiver circuit 118 that may include components for receiving test signals from the optical module 130. The transmission circuit 116 and/or the receiver circuit 118 may also include other components, such as a demodulator, a decoder, an ADC, and/or other circuit components or elements.

According to examples, the test instrument 100 may include the ability to automatically change optical module signal characterization settings, e.g., equalization setting values 120, such that values of those settings may be modified to achieve better or more optimal electrical signal communication performance with the optical module 130. As discussed in greater detail herein, the equalization settings may include a pre-cursor, a post-cursor, a swing, etc., with each of the equalization settings having multiple available values 120. Generally speaking, changing the equalization setting values 120 may affect the performance of electrical signal communications with the optical module 130, e.g., bit error rates of electrical signals communicated with the optical module 130. As discussed herein, the equalization setting values 120 may include setting values for signals that the transmission circuit 116 outputs to the optical module 130 and/or setting values for signals that the optical module 130 generates and sends to the receiver circuit 118.

The test instrument 100 may further include an electrical interface 124, which is an interface that connects to the optical module 130 to send electrical signals to and receive electrical signals from the optical module 130. The electrical interface 124 may include a physical connector and/or a wire. Transmit path lanes 126 may be used to transmit digital data, such as test signals, to the optical module 130 and receive path lanes 128 may be used to receive digital data from the optical module 130. The lanes 126 and 128 may include non-return-to-zero (NRZ) lanes carrying NRZ encoded data, however, other types of encoding may be used. The lanes 126 and 128 may be serial lanes but together may carry bits for parallel data transmission.

The optical module 130 may include an electrical interface 132, also referred to as a host interface, and an optical interface 134, also referred to as a line interface. The electrical interface 132 may connect to an electrical interface of a host device, such as the test instrument 100. For example, as shown in FIG. 1, the electrical interface 132 may connect to the electrical interface 124 of the test instrument 100 to send electrical signals to and receive electrical signals from the test instrument 100.

The electrical interface 124 is shown as including a transmit path test instrument host interface (Tx HIF) 136 to receive electrical signals from the test instrument 100, and a receive path test instrument host interface (Rx HIF) 138 to transmit electrical signals to the test instrument 100. Tx HIF 136 and Rx HIF 138 may be a single interface or separate interfaces. The optical interface 134 may connect to a fiber optic cable to carry data toward a destination or to receive data from a source. The optical interface 134 is shown as including a transmit path line interface (Tx LIF) 140 for transmitting optical signals on the optical fiber, and a receive path line interface (Rx LIF) 142 for receiving optical signals from the optical fiber.

According to examples, a loopback line 144 may be connected to Tx LIF 140 and Rx LIF 142 to loopback optical signals transmitted from the optical module 130 back to the optical module 130. The loopback line 144 may be an optical cable connecting Tx LIF 140 and Rx LIF 142. The loopback line 144 provides a return path for test signals, which may include test signals generated by the test signal generator 102. The loopback line 144 may be disconnected from the Tx LIF 140 and the Rx LIF 142 following testing of the optical module 130. In some examples, the optical module 130 may include an internal loopback (not shown) instead of the external loopback line 144 shown in FIG. 1. In these examples, the internal loopback may loop electrical signals received from the test instrument 100 back to the test instrument 100. In other words, the internal loopback may loop back the electrical signals without first converting the electrical signals to optical signals. The optical module 130 may be configured to selectively enable use of the internal loopback during testing and to disable use of the internal loopback during normal use of the optical module 130.

In some examples, the test instrument 100 may include a loopback (not shown) that may loop electrical signals received from the optical module 130 back to the optical module 130. The loopback may connect, for instance, the receiver circuit 118 to the transmission circuit 116 such that the electrical signals received from the optical module 130 may be returned to the optical module 130. The test instrument 100 may loop the electrical signals back to the optical module 130 in instances in which the optical module 130 is configured to generate the electrical signals and to determine signal quality metrics of the electrical signals communicated to and received from the test instrument 100.

As shown in FIG. 2, the controller 106 may be programmed with instructions 200-208 that the controller 106 may execute. As shown, the controller 106 may execute the instructions 200 to control the test signal generator 102 to generate test signals with respective ones of a plurality of equalization (EQ) setting value permutations applied on the test signals. Particularly, the controller 106 may execute the instructions 200 as part of an automatic equalization setting value determination operation for the optical module 130 in which test signals, with the equalization setting values applied to the test signals, may iteratively be outputted to the optical module 130. That is, during a first iteration, the controller 106 may set the equalization setting values 120 to a first permutation and may cause the transmission circuit 116 to output a test signal to the optical module 130 through the electrical interface 124 and the transmit path lanes 126 with the equalization setting values 120 applied to the test signal. The first permutation may include a certain value for a pre-cursor, a certain value for a post-cursor, and a certain value for a swing applied to a test signal to, for instance, change a characterization of the test signal.

Figure 3:
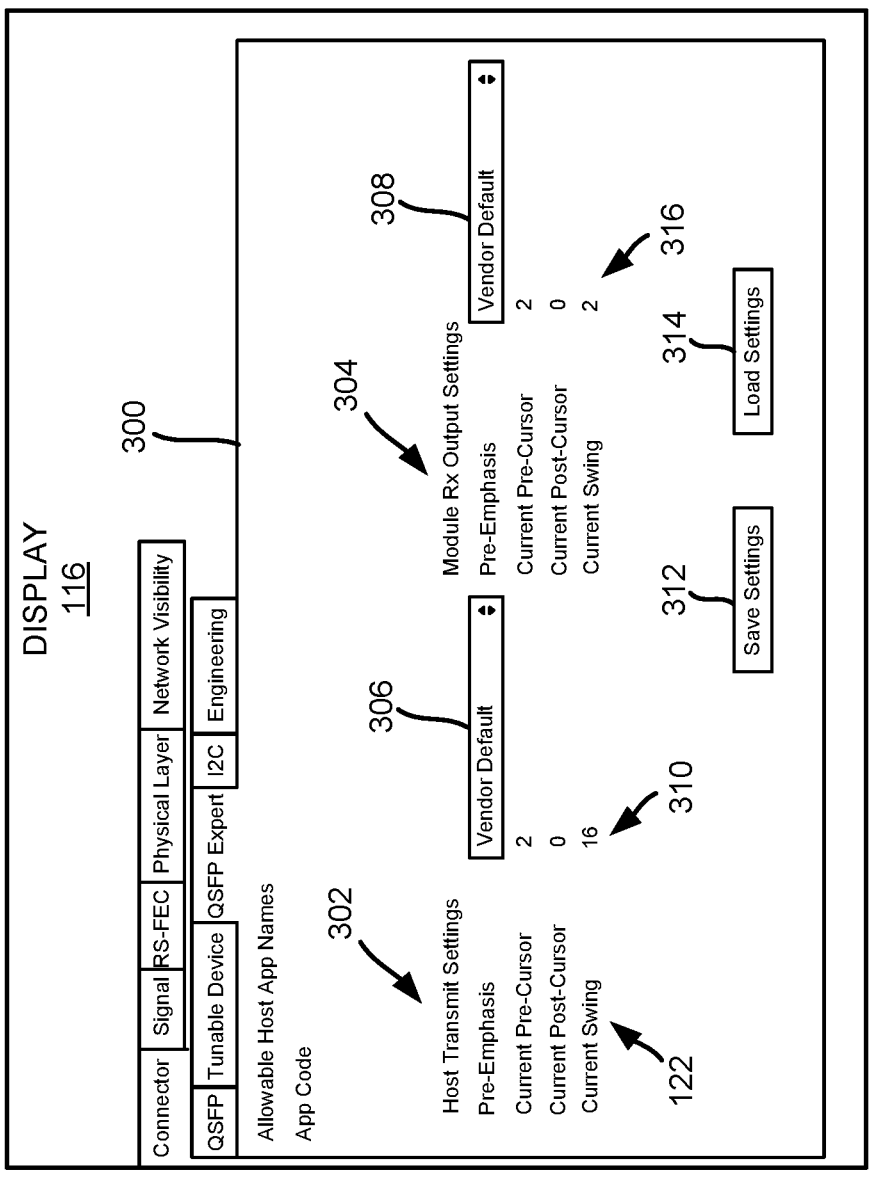
FIG. 3 shows a quad small form factor pluggable (QSFP) expert screen displayed on the display of the test instrument depicted in FIG. 1, in accordance with an example of the present disclosure.

An example of a manner in which the equalization setting values 120 may be set is depicted in FIG. 3, which shows a diagram of the display 114 of the test instrument 100. Particularly, FIG. 3 shows a quad small form factor pluggable (QSFP) expert screen 300 displayed on the display 114 of the test instrument 100 depicted in FIG. 1, in accordance with an example of the present disclosure. As shown in FIG. 3, the equalization setting values 120 may include host transmit settings 302 and module Rx output settings 304. Particularly, the host transmit settings 302 may include the equalization setting values 120 that may be applied to the test signals outputted from the test instrument 100 and the module Rx output settings 304 may be the equalization setting values 120 that may be applied to the test signals that are generated in and outputted from the optical module 130.

The host transmit settings 302 and the module Rx output settings 304 may include a pre-emphasis option 306, 308 in which the equalization setting values 120 may be set to predefined values. For instance, one of the pre-emphasis options 306, 308 may be a vendor default setting in which the equalization setting values 120 may be set to values defined by the optical module 130 vendor. Another one of the pre-emphasis options 306, 308 may be a previously stored setting while a further one of the pre-emphasis options 306, 308 may be an option for the test instrument 100 to automatically determine the equalization setting values 120 for the optical module 130. In some examples, the controller 106 may execute the instructions 200-208 responsive to the automatic determination option being selected.

As shown in FIG. 3, the equalization settings 122 may include a pre-cursor, a post-cursor, and swing. The pre-cursor, which may also be called a pre-cursor signal, a pre-emphasis signal, or a pre-cursor tap, may correspond to a small spike or pulse that is to appear just before a main pulse in electrical signals communicated out of the test instrument 100. Pre-cursors may be used to help reduce the effects of intersymbol interference (ISI) caused by the main pulse. The post-cursor, which may also be called a post-cursor signal, a de-emphasis signal, or a post-cursor tap, may correspond to a small spike or pulse that is to appear just after the main pulse in the electrical signals. Post-cursors may be used to help reduce the effects of ISI caused by the main pulse. The swing may be defined as the difference between the maximum and minimum amplitudes of a signal over a specific period of time. Swing may be used to describe the range of voltage levels used to represent a signal.

The pre-cursor, the post-cursor, and the swing may have finite ranges of values 310 and may be the same or may differ from each other. By way of particular non-limiting example, the values set for the pre-cursor and the post-cursor may range from 0 to 17 and the value for the swing may range from 0 to 31. In some examples, a user may vary the equalization setting values 120. However, as discussed herein, the controller 106 may automatically determine the equalization setting values 120 that result in an optimized signal quality metric among the equalization setting value permutations that are tested.

The controller 106 may execute the instructions 202 control the transmission circuit 116 to output multiple ones of the generated test signals through the electrical interface 124 to the optical module 130. As discussed herein, the test instrument 100 is to receive the test signals back from the optical module 130 through the electrical interface 124. Particularly, the test instrument 100 may receive the test signals back from the optical module 130 through the electrical interface 124.

According to an example shown with respect to FIG. 1, the optical module 130 may receive the test signal through the transmit path test instrument host interface (Tx HIF) 136. The optical module 130 may convert the test signal into equivalent light signals and may output the light signals through the transmit path line interface (Tx LIF) 140. Additionally, the light signals may be looped back into the optical module 130 through the loopback line 144 and the receive path line interface (Rx LIF) 142. The optical module 130 may convert the light signals to equivalent electrical signals and may output the electrical signals to the test instrument 100 through the receive path test instrument host interface (Rx HIF) 138, the receive path lanes 128, and the electrical interface 124.

In other examples in which the optical module 130 includes an internal loopback, the optical module 130 may receive the test signal through the instrument host interface transmit path (Tx HIF) 136 and may return the test signal back to the receive path test instrument host interface (Rx HIF) 138 through the internal loopback. In some examples, the optical module 130 may return the test signal without converting the electrical signal to an optical signal and converting the optical signal back to an electrical signal. In other examples, the optical module 130 may convert the test signal to optical signal and may covert the optical signal back to an electrical signal prior to returning the test signal back to the test instrument 100.

The controller 106 may execute the instructions 204 to determine respective signal quality metrics of the test signals received from the optical module 130. Particularly, the controller 106 may determine the signal quality metrics of the test signals resulting from application of the plurality of equalization setting value permutations on the test signals. In some examples, the controller 106 may determine the signal quality metrics from test signals generated in the test instrument 100, communicated to the optical module 130, and received back from the optical module 130. In other examples, and as discussed in greater detail herein below, the controller 106 may determine the signal quality metrics from test signals generated in the optical module 130 and communicated from the optical module 130 to the test instrument 100.

In some examples, the test signal analyzer 104 may analyze the electrical signal received from the optical module 130 to determine a quality of the test signal. For instance, the test signal analyzer 104 may determine a signal quality metric of the test signal from the received electrical signal. According to an example in which the signal quality metric is a bit error rate, the test signal analyzer 104 may determine the bit error rate of the test signal by dividing the quantity of bits received in error by the total number of bits transmitted within the same time period. In other examples, and as discussed in greater detail herein below, the optical module 130 may determine the signal quality metric of the test signal received from the test instrument 100 and may communicate the determined signal quality metric, such as the bit error rate, to the test instrument 100. In any of these examples, the controller 106 may store the signal quality metric resulting from the first equalization setting value permutation applied on the test signal in the data store 110.

The controller 106 may change the equalization setting values 120 to another permutation and may cause the transmission circuit 116 to output a second test signal to the optical module 130. For instance, the controller 106 may increase the value of the pre-cursor setting while keeping the post-cursor setting and the swing setting at the previous values. The test instrument 100 may also receive the second test signal from the optical module 130 and the test signal analyzer 104 may determine the signal quality metric of the second test signal. The controller 106 may repeat this process of determining and storing signal quality metrics of test signals with a plurality of additional equalization setting value permutations applied to the test signals.

In examples in which the optical module 130 is able to generate the test signals, the controller 106 may instruct a test signal generator (not shown) in the optical module 130 to generate test signals with respective ones of a plurality of equalization (EQ) setting value permutations applied on the test signals. Particularly, the controller 106 may instruct the optical module 130, as part of an automatic equalization setting value determination operation for the optical module 130, to generate the test signals with the equalization setting values applied to the test signals and to iteratively output the test signals to the test instrument 100. That is, during a first iteration, the controller 106 may set the equalization setting values 120 to a first permutation and may cause the optical module 130 to output a test signal to the test instrument 100 through the receive path test instrument host interface (Rx HIF) 138 with the equalization setting values 120 applied to the test signal. The first permutation may include a certain value for a pre-cursor, a certain value for a post-cursor, and a certain value for a swing applied to a test signal to, for instance, change a characterization of the test signal.

In some examples, the receiver circuit 118 in the test instrument 100 may receive the test signal and may send the test signal to the transmission circuit 116, which may return the test signal to the optical module 130. In other examples, the test instrument may include a loopback line through which the test signals received from the optical module 130 may be returned to the optical module 130. In any of these examples, the test signals may be returned to the optical module 130 through the transmit path test instrument host interface (Tx HIF) 136. In addition, the optical module 130 may include a test signal analyzer (not shown) that may analyze the received test signal to determine a signal quality metric of the test signal. The optical module 130 may also send the determined signal quality metric to the test instrument 100 and the controller 106 may store the signal quality metric in the data store 110.

In any of the examples discussed herein, the controller 106 may perform a predetermined number of permutation iterations, perform the permutation iterations for a predetermined length of time, until a predetermined condition is met, and/or the like. In other examples, the controller 106 may iterate through every possible combination of the equalization setting value permutations.

In some examples, the controller 106 may cause the equalization setting value permutations to be moved or changed in a certain direction (increased or decreased) in subsequent iterations and may determine whether the signal quality metrics resulting from the test signals outputted using those permutations are increasing or decreasing. For instance, the controller 106 may cause the equalization setting values 120 to sequentially increase, e.g., increase the pre-cursor value, over subsequent iterations. Based on a determination that the signal quality metrics are increasing, the controller 106 may cause the direction in which the equalization setting values 120 are being changed to be reversed. In addition, the controller 106 may continue to determine the signal quality metrics until the signal quality metrics stop improving and/or start degrading. In other words, the controller 106 may move the equalization setting value permutations in a direction that optimizes convergence on the optimal signal quality metric, e.g., a minimal bit error rate.

In other examples, the controller 106 may continue to iterate through the equalization setting value permutations until the controller 106 determines that the optical signal quality metric has been identified, e.g., the bit error rate has reached a minimum value. For instance, the controller 106 may determine the equalization setting value permutations at which the bit error rates cease to decrease and begin to increase.

According to examples, the controller 106 may employ artificial intelligence (AI) to recognize patterns in convergence given inputs of vendor setting defaults, electrical signal operation rate (ex. NRZ, PAM4, etc., between the test instrument 100 and the optical module 130) and the equalization setting values 120 that result in the optimal signal quality metric. For instance, the controller 106 may determine the equalization setting values 120 that result in the optimal signal quality metric through use of AI techniques by recognizing patterns and deriving potential inferences and predictions to model future optimization attempts.

According to examples, the controller 106 may group equalization setting values 120 by ranges of effective signal strength (e.g., dBm). This operates on the principle that the equalization setting values 120 (e.g., equalization: pre-cursor, post-cursor, and swing-a/k/a amplitude) interact in such a way as to produce a net effective dBm (NE-dBM) on the overall signal quality. The controller 106 may operate by trying one sample from each group of equalization setting values 120 (using its median dBm datapoint within the group). The controller 106 may, in a second pass, reduce the total number of datapoints to the group with the best performance (from its median net effective dBm) and picking those datapoints with the next lower five dBm datapoints as well as the next higher dBm datapoints. This would limit the remainder of the test to brute-force over just five trials as opposed to the universe of permutations.

The following example is provided in which the pre-cursor range is 0-5, the post-cursor range is 0-5, and the swing/amplitude range is 0-4. In this example, the total number of permutations is, 6×6×5, which is 180. In this example, the controller 106 may perform the following operations:

a. algorithmically calculate the net effective dBm from the 180 datapoints of equalization setting values (pre-cursor, post-cursor, amplitude).

b. sort all of the 180 datapoints of equalization setting values from lowest to highest net effective dBm (NE-dBm).

c. place the first 18 datapoints of equalization setting values in group 1.

d. then place the next 18 datapoints of equalization setting values in group 2.

e. the last group would be the last 18 datapoints of equalization setting values. Group 1 . . . . Group 10 will each have 18 datapoints of equalization setting values (pre-cursor, post-cursor, amplitude).

f. for each of the ten groups, find the optimum performance using the median net effective dBm datapoint from each group. Assume for this example that the median datapoint from group 4 performs optimally.

g. from group 4, take the five NE-dBm points lower but nearest the median datapoint.

h. then from group 4, take the five NE-dBm points higher but nearest the median datapoint.

i. brute force test the ten datapoints from (g) and (h) and the one with the optimal signal quality.

The following example is provided using the following data:

a. Group 4 with 18 NE-dBm sorted data-points (ascending):

{datapoint—1: lowest NE-dBm within the group, datapoint—2: NE-dBm higher than datapoint—1, but closest to it.

datapoint—9: NE-dBm lower than datapoint—10, but closest to it.

datapoint—10: media NE-dBm in the group datapoint—11: NE-dBm higher than datapoint—10, but closest to it.

. . .

datapoint 18: highest NE-dBm in the group}

When the median NE-dBm of group 4 shows the best quality, the controller 106 may execute a brute force check over {datapoint—5 thru datapoint-9} and {datapoint—11 thru datapoint—15} and take the datapoint with the best signal quality if it is better than the median NE-dBm.

The controller 106 may execute the instructions 206 to determine which of the plurality of equalization setting value permutations resulted in an optimal signal quality metric among the outputted test signals. For instance, the controller 106 may determine the optimal signal quality metric, e.g., the minimal bit error rate, stored in the data store 110 and may determine the equalization setting values 120 that resulted in the optimal signal quality metric.

The controller 106 may execute the instructions 208 to set the equalization setting values 120 for the test instrument 100 and/or the optical module 130 to the equalization setting value permutation that resulted in the optimal signal quality metric among the outputted test signals stored in the data store 110. The controller 106 may automatically store the equalization setting values 120 for the test instrument 100 and/or the optical module 130. In addition, or alternatively, the QSFP expert screen 300 may display a button 312 to provide the user with the option to save the values of the equalization setting values 120.

In some examples, the QSFP expert screen 300 may display a button 314 to provide the user with the option to load previously saved equalization setting values 120. When the button 314 is pressed, the user may be provided with the option to select from previously stored equalization setting values 120, which the controller 106 may have determined through implementation of the features disclosed herein. Thus, for instance, when different types of optical modules 130 and/or optical modules 130 from different vendors are to be tested, the optimal equalization setting values 120 for those optical modules 130 may not be determined again, but instead, the previously determined setting values may be set for those optical modules 130.

Figure 4:
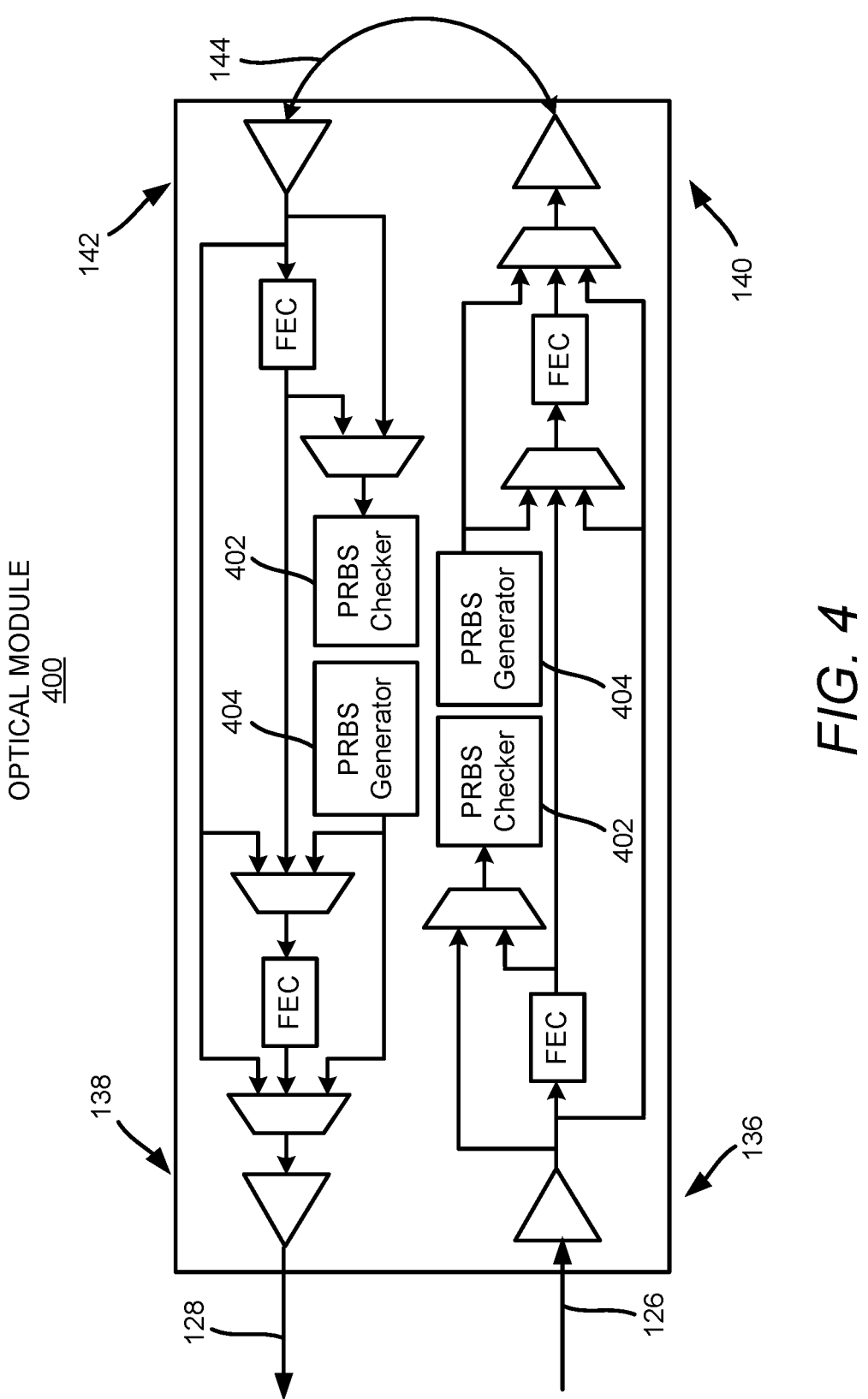
FIG. 4 shows a block diagram of an optical module that may analyze test signals and/or generate test signals, in accordance with an example of the present disclosure.

In the example shown in FIG. 1, the test signal analyzer 104 may analyze the test signal that is returned to the test instrument 100 from the optical module 130. In other examples, and as shown in FIG. 4, an optical module 400 may be configured to analyze the test signal itself and to provide the results of the analysis to the test instrument. FIG. 4 shows a block diagram of an optical module 400 that may analyze test signals and/or generate test signals, in accordance with an example of the present disclosure. In this regard, the optical module 400 may include a test signal analyzer 402, e.g., a PRBS checker 402, to analyze test signals communicated to the optical module 400 through the transmit path lanes 126. For instance, the PRBS checker 402 may determine the signal quality metrics of the test signals and may communicate the determined signal quality metrics to the test instrument 100 through the receive path lanes 128.

In some examples, the optical module 400 may also include a test signal generator 404, e.g., a PRBS generator 404, that may generate test signals and may apply a plurality of equalization setting values 120 to the test signals. The PRBS generator 404 may generate the test signals and may communicate the test signals to the test instrument 100 with respective ones of the plurality of equalization setting values 120 applied to the test signals through the receive path lanes 128. According to a first example shown in FIG. 4, the PRBS checker 402 and the PRBS generator 404 may be provided along the Tx HIF 136 and the Tx LIF 140 path. In a second example, and as also shown in FIG. 4, the PRBS checker 402 and the PRBS generator 404 may be provided along the Rx LIF 142 and the receive path test instrument host interface (Rx HIF) 138. The optical module 400 may include additional components, such as forward error correction circuits, amplifiers, etc.

According to examples in which the optical module 400 generates the test signals, the controller 106 may determine equalization setting values 120 for the optical module 400 and may instruct the optical module 400 to output the test signals with the equalization setting values 120 applied to the test signals. For instance, the controller 106 may determine module Rx output settings 304 that may result in an optimal signal quality metric among test signals outputted by the optical module 400. As shown in FIG. 3, the equalization setting values 120 for the module Rx output settings 304 may also include a pre-cursor setting, a post-cursor setting, and swing setting. The pre-cursor, the post-cursor, and the swing may have finite ranges of values 316 and may be the same or may differ from each other. By way of particular example, the values set for the pre-cursor and the post-cursor may range from 0 to 17 and the value for the swing may range from 0 to 31. In some examples, a user may vary the values for one or more of the equalization setting values 120. However, as discussed herein, the controller 106 may automatically determine the values for the equalization setting values 120 for the optical module 130 that result in an optimized signal quality metric among the equalization setting value permutations that are tested.

According to examples, the controller 106 may iterate through a plurality of equalization setting value permutations on the test instrument 100, on the optical module 400, or both the test instrument 100 and the optical module 400. As discussed herein, the controller 106 may employ artificial intelligence techniques and/or machine learning techniques to more efficiently determine the equalization setting value permutation that results in the optimal signal quality metric in a quicker or more efficient manner than employing a brute force technique to determine the equalization setting value permutation.

Various manners in which the controller 106 of the test instrument 100 may operate are discussed in greater detail with respect to the method 500 depicted in FIG. 5. Particularly, FIG. 5 depicts a flow diagram of a method 500 for determining equalization setting values for a test instrument 100 and/or an optical module 130, 400, according to an example of the present disclosure. It should be understood that the method 500 may include additional operations and that some of the operations described therein may be removed and/or modified without departing from the scope of the method 500. The description of the method 500 is made with reference to the features depicted in FIGS. 1-4 for purposes of illustration.

At block 502, the controller 106 may cause test signals to iteratively be outputted to the optical module 130, 400 from the test instrument 100. As discussed herein, and according to an example, the controller 106 may cause the test signal generator 102 in the test instrument 100 to iteratively generate test signals and to output the test signals using respective ones of a plurality of equalization setting value permutations. Additionally, the test signals with the equalization setting value permutations applied to the test signals may be communicated to the optical module 130, 400 through the electrical interface 124, the transmit path lanes 126, and the Tx HIF 136.

Alternatively, at block 502, the controller 106 may cause test signals to iteratively be outputted by the optical module 130, 400 to the test instrument 100. In addition, the test signals may be outputted with respective ones of a plurality of equalization setting value permutations applied to the test signals. As discussed herein, and according to an example, the controller 106 may cause a test signal generator in the optical module 130, e.g., the PRBS generator 404, to iteratively generate test signals and to output the test signals using respective ones of the plurality of equalization setting value permutations. Additionally, the test signals with the equalization setting value permutations applied to the test signals may be communicated to the test instrument 100 through the receive path test instrument host interface (Rx HIF) 138, receive path lanes 128, and the electrical interface 124.

At block 504, the controller 106 may determine signal quality metrics of the test signals received from the optical module 130, 400. In a first example, in which the controller 106 causes the test signals to be outputted from the test instrument 100 to the optical module 130, 400, the optical module 130, 400 may communicate the test signals back to the test instrument 100, for instance, through a loopback line 144 (or an internal loopback line), the Rx LIF 142, and the Rx HIF 138 as shown in FIG. 1. In this example, the controller 106 may cause the test signal analyzer 104 to determine the signal quality metrics from the test signals received from the optical module 130. In addition, or alternatively, the optical module 130, 400 may determine the signal quality metrics and the controller 106 may determine the signal quality metrics through receipt of the signal quality metrics from the optical module 130, 400.

In a second example in which the controller 106 caused the optical module 130 to output the test signals, the optical module 130, 400 may generate and output the test signals either through the loopback line 144 or directly through the Rx HIF 138. In this example, the test signal analyzer 104 may determine the signal quality metrics. Alternatively, the test instrument 100 may send the test signals back to the optical module 130, 400 and a test signal analyzer, e.g., the PRBS checker 402, may determine the signal quality metrics of the test signals.

At block 506, the controller 106 may determine which of the plurality of equalization setting value permutations resulted in an optical signal quality metric, e.g., a minimal bit error rate, among the outputted test signals. In some examples, the controller 106 may iterate through the plurality of equalization setting value permutations according to a predefined order of equalization setting value permutations. In addition, or alternatively, the controller 106 may iterate through a plurality of equalization setting value permutations on the test instrument 100, on the optical module 130, 400, or both the test instrument 100 and the optical module 130, 400.

As discussed herein, the controller 106 may perform a predetermined number of permutation iterations, perform the permutation iterations for a predetermined length of time, until a predetermined condition is met, or the like. In other examples, the controller 106 may iterate through every possible combination of the equalization setting value permutations. As also discussed herein, the controller 106 may implement an optimization routine to reduce or minimize the amount of time and/or iterations performed to determine the equalization setting value permutation that results in an optimal signal quality metric. For instance, the controller 106 may use artificial intelligence or machine learning techniques to optimize determination of the equalization setting values that result in the optimal signal quality metric.

At block 508, the controller 106 may set equalization setting values 310, 316 for the test instrument 100 and/or the optical module 130, 400 to the equalization setting value permutation that resulted in the optimal signal quality metric among the outputted test signals.

Figure 6:
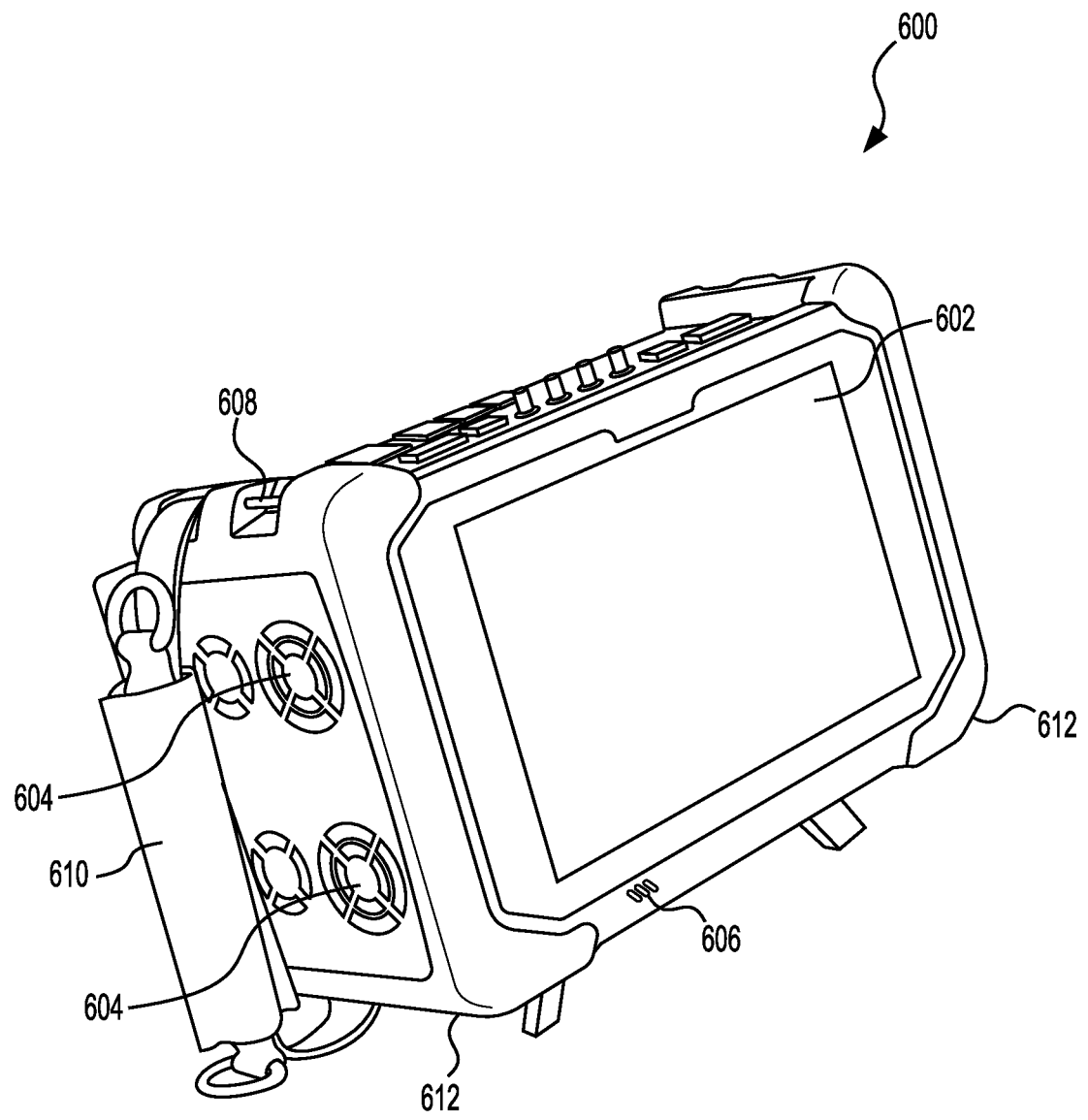
FIG. 6 illustrates a front perspective view of a test instrument for performing tests and measurements, according to an example of the present disclosure.

FIG. 6 illustrates a front perspective view of a test instrument 600 for performing tests and measurements, according to an example of the present disclosure. The test instrument 600 may be a hand-held tool and may be equivalent to the test instrument 100 discussed herein. In this regard, the test instrument 600 may include each of the components of the test instrument 100 and may perform operations similar to those discussed herein with respect to the test instrument 100. For instance, the test instrument 600 may be employed for cell site installation, testing, measurement, and maintenance. In another example, the test instrument 600 may be used for testing high capacity networks, including optical 400G networks. Furthermore, the test instrument 600 may be employed to automatically determine equalization setting values for an optical module 130 as discussed herein.

According to an examples, the test instrument 600 may include a display 602 that provides user control and information. The display 602 may be equivalent to the display 114 depicted in FIG. 1 and may be a touch screen, e.g., liquid crystal display (LCD) touchscreen. A user may instruct the test instrument 600 to initiate an automatic equalization setting value determination operation as discussed herein. The test instrument 600 may also provide user information including: a listing of jobs, a listing of reports to be compiled, a compilation of executed test results in a test report or test reports, an interface control with a work station or server, and/or the like, on the display 602.

According to the illustrated example of FIG. 6, the test instrument 600 may include ventilation ports 604 provided to the outer structure of the test instrument 600 to facilitate internal cooling of components by way of an internal cooling unit. The test instrument 600 may also include a loudspeaker 606 that provides audio information and support structures 608 for attachment of a support strap 610. According to an example, the support structures 608 are metal pins permanently secured to the structure of the test instrument 600. The test instrument 600 may further include elastomeric bumpers 612 to provide impact protection.

Figure 7:
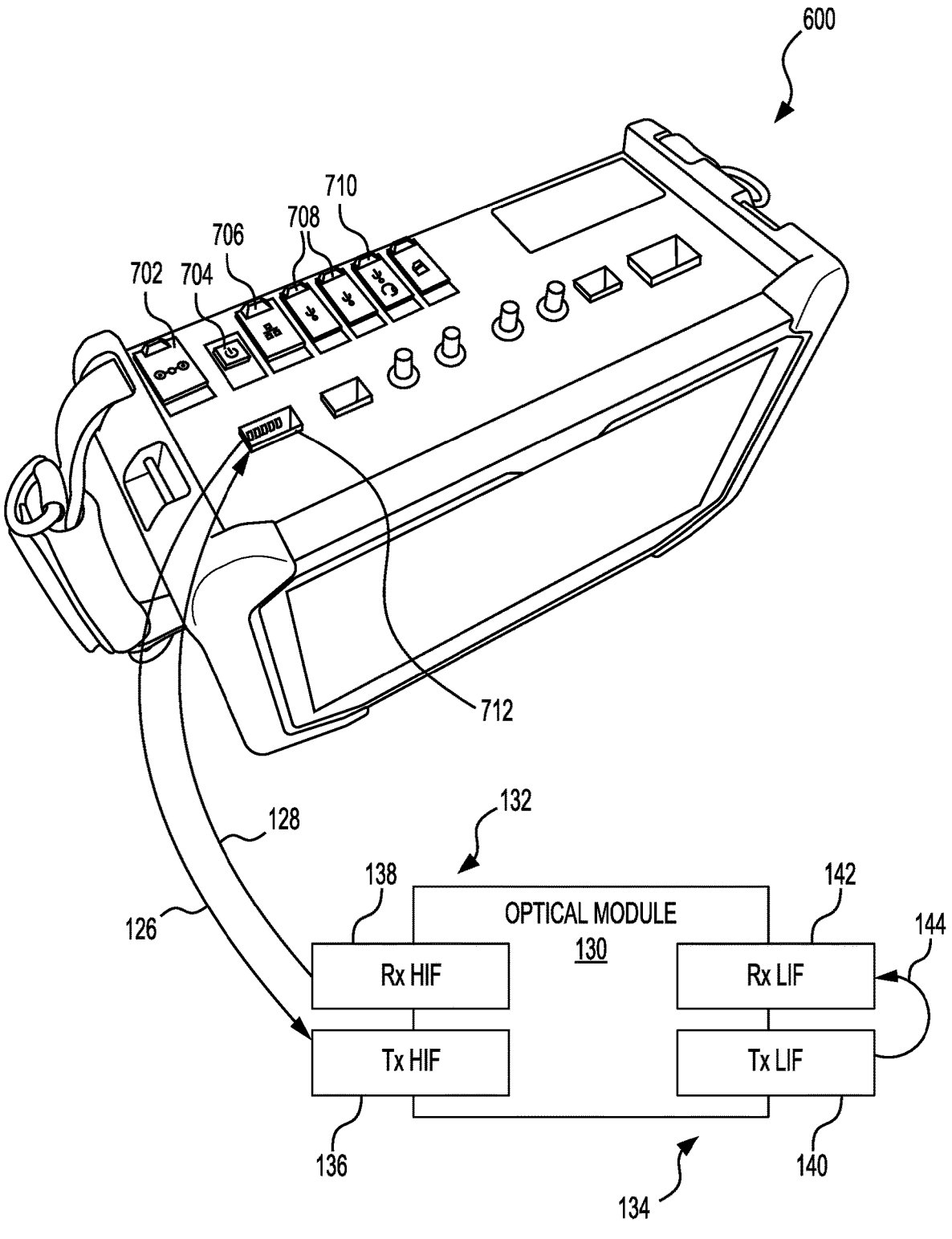
FIG. 7 illustrates a top perspective view of the test instrument depicted in FIG. 6, according to an example of the present disclosure.

FIG. 7 illustrates a top perspective view of the test instrument 600 depicted in FIG. 6, according to an example of the present disclosure. In some examples, the test instrument 600 may include a plurality of elements that may be used for cell site installation, testing, measurement, and maintenance. As shown, the test instrument 600 may include a DC input 702 configured to receive DC power for the test instrument 600 from an external power supply and a power button 704 that a user may depress to power the test instrument 600 on and off.

The test instrument 600 may also include an Ethernet port 706 is an RJ-45 jack to provide 10/100/1000-baseT Ethernet management. The test instrument 600 may further include a plurality of USB ports 708, which may be USB-C ports, USB-A Interfaces, etc. The test instrument 600 may still further include an audio jack 710 that provides a direct audio interface by accepting, for instance, a 3 mm male plug. Each of the above-identified ports may be covered by a cover that may be movable between covering and open positions. Although not shown, the test instrument 600 may include, internal to the test instrument 600, a wireless network module to support wireless network communication, such as at 2.4 GHz and 5 GHz, and a Bluetooth module to support Bluetooth communication with an external device, such as a Bluetooth audio headset.

As also shown in FIG. 7, the test instrument 600 may include a port 712, such as a QSFP DD port, to which the optical module 130 may be connected. The port 712 may be part of the electrical interface 124 through which an optical module 130 may communicate with the test instrument 600 as discussed herein. The test instrument 600 may also include additional types of ports, such as SFP-DD/SFPx, QSFPx, OSFP, etc.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A test instrument comprising:
a test signal generator;
a transmission circuit;
an electrical interface connectable to an optical module; and
a controller to:
control the test signal generator to generate test signals with respective ones of a plurality of equalization setting value permutations applied on the test signals;
control the transmission circuit to iteratively output the generated test signals through the electrical interface to the optical module, wherein the test instrument is to receive the test signals back from the optical module through the electrical interface;
determine respective signal quality metrics of the test signals received from the optical module; and
determine which of the plurality of equalization setting value permutations resulted in an optimal signal quality metric among the outputted test signals.

2. The test instrument of claim 1, wherein the controller is to:
set values for equalization settings to be applied on electrical signals outputted to the optical module to values corresponding to the equalization setting value permutation that resulted in the optimal signal quality metric among the outputted test signals.

3. The test instrument of claim 1, wherein the plurality of equalization setting value permutations comprise pre-cursor values, post-cursor values, and swing values.

4. The test instrument of claim 1, further comprising:
a receiver circuit to receive test signals from the optical module; and
a test signal analyzer, wherein the controller is to control the test signal analyzer to determine the respective signal quality metrics of the test signals received through the receiver circuit.

5. The test instrument of claim 1, wherein the controller is to
control the test signal generator to generate the test signals while iterating through the plurality of equalization setting value permutations according to a predefined order of equalization setting value permutations.

6. The test instrument of claim 1, wherein the controller is to
control the test signal generator to generate the test signals while iterating through the plurality of equalization setting value permutations for the test instrument, for the optical module, or for both the test instrument and the optical module.

7. The test instrument of claim 1, wherein the controller is to:
move the equalization setting value permutations in a first direction during iterations of the equalization setting value permutations;
determine that the signal quality metric is decreasing during the iterations of the equalization setting value permutations; and
reverse the equalization setting value permutations to move in a second direction based on the determination that the signal quality metric is decreasing.

8. The test instrument of claim 1, wherein the controller is to cause the test signals to be outputted while iterating through the plurality of equalization setting value permutations according to a predefined order of equalization setting value permutations.

9. A method for determining equalization setting values for an optical module, the method comprising:

causing, by a controller of a test instrument, test signals to be:

iteratively outputted to the optical module; or iteratively outputted by the optical module, wherein the test signals are outputted with respective ones of a plurality of equalization setting value permutations applied to the test signals and wherein the test instrument is to receive the test signals from the optical module;

determining, by the controller, signal quality metrics of the test signals received from the optical module;

determining, by the controller, which of the plurality of equalization setting value permutations resulted in an optimal signal quality metric among the outputted test signals; and setting, by the controller, equalization setting values for at least one of the optical module or the test instrument to the equalization setting value permutation that resulted in the optimal signal quality metric among the outputted test signals.

10. The method of claim 9, wherein the plurality of equalization setting values comprise pre-cursor values, post-cursor values, and swing values.

11. The method of claim 9, further comprising:

causing the test signals to be outputted while iterating through the plurality of equalization setting value permutations according to a predefined order of equalization setting value permutations.

12. The method of claim 9, further comprising:

moving the equalization setting value permutations in a direction that optimizes convergence on the optimal quality metric.

13. The method of claim 9, further comprising:

determining the signal quality metrics of the test signals generated by the optical module and received from the optical module.

14. The method of claim 9, wherein the optical module is to determine the signal quality metrics of the test signals, and wherein determining the signal quality metrics of the test signals received from the optical module further comprises:

determining the signal quality metrics of the test signals through receipt of the determined signal quality metrics from the optical module.

15. The method of claim 9, further comprising:

causing the test signals to be outputted while iterating through a plurality of equalization setting value permutations for the test instrument, for the optical module, or for both the test instrument and the optical module.

16. A test instrument comprising:

an electrical interface connectable to an optical module;

a data store; and a controller to:

cause test signals to:

iteratively be outputted to an optical module through the electrical interface; or iteratively be outputted by the optical module, wherein the test signals are outputted with respective ones of a plurality of equalization setting value permutations applied to the test signals and wherein the test instrument is to receive the test signals from the optical module;

determine respective signal quality metrics of the test signals received from the optical module; and determine which of the plurality of equalization setting value permutations resulted in an optimal signal quality metric among the outputted test signals.

17. The test instrument of claim 16, wherein the controller is to:

set values for the equalization settings to be applied on electrical signals outputted to the optical module or to be applied to electrical signals outputted by the optical module to values corresponding to the equalization setting value permutation that resulted in the optimal signal quality metric among the outputted test signals.

18. The test instrument of claim 16, wherein the plurality of equalization setting values comprise pre-cursor values, post-cursor values, and swing values.

19. The test instrument of claim 16, further comprising:

a transmission circuit to output the test signals with the respective ones of the plurality of equalization setting value permutations applied to the test signals through the electrical interface to the optical module; and a receiver circuit to receive test signals from the optical module through the electrical interface.

20. The test instrument of claim 16, wherein the controller is to cause the test signals to be outputted while iterating through a plurality of equalization setting value permutations on the test instrument, on the optical module, or both the test instrument and the optical module.

* * * * *